US00RE45575E

(19) United States
(12) Reissued Patent
Lippert et al.

(10) Patent Number: US RE45,575 E
(45) Date of Reissued Patent: Jun. 23, 2015

(54) OPTICAL ARRANGEMENT FOR THE PRODUCTION OF A LIGHT-SHEET

(71) Applicant: Carl Zeiss Microscopy GmbH, Jena (DE)

(72) Inventors: Helmut Lippert, Jena (DE); Matthias Wald, Jena (DE); Benno Radt, Jena (DE)

(73) Assignee: Carl Zeiss Microscopy GmbH, Jena (DE)

(21) Appl. No.: 13/932,475

(22) Filed: Jul. 1, 2013

Related U.S. Patent Documents

Reissue of:
(64) Patent No.: 7,787,179
Issued: Aug. 31, 2010
Appl. No.: 11/946,232
Filed: Nov. 28, 2007

U.S. Applications:
(62) Division of application No. 13/600,663, filed on Aug. 31, 2012, which is an application for the reissue of Pat. No. 7,787,179.

(30) Foreign Application Priority Data

Mar. 29, 2007 (DE) ..... 10 2007 015 063

(51) Int. Cl.
*G02B 21/06* (2006.01)
*G02B 9/08* (2006.01)
*G02B 21/00* (2006.01)

(52) U.S. Cl.
CPC ..... *G02B 21/06* (2013.01); *G02B 21/0032* (2013.01); *G02B 21/0076* (2013.01)

(58) Field of Classification Search
CPC . G02B 21/0032; G02B 21/06; G02B 21/0076
USPC ..... 359/368, 385, 652, 708, 739, 740
See application file for complete search history.

(56) References Cited

U.S. PATENT DOCUMENTS 4,826,299 A 5/1989 Powell
6,137,631 A 10/2000 Moulin
2007/0247614 A1* 10/2007 Puah et al. ..... 356/73

FOREIGN PATENT DOCUMENTS

DE 195 20 187 9/1996
DE 102 57 423 6/2004

(Continued)

OTHER PUBLICATIONS

Patent Abstract of Japan—Publication No. 2005062421 published Mar. 10, 2005 Ohkura Industry Co "Line-Like Light Beam Generator and Laser Microscope".

*Primary Examiner* — James Menefee
(74) *Attorney, Agent, or Firm* — Frommer Lawrence & Haug LLP

(57) ABSTRACT

The invention is directed to an optical arrangement with a light source for emitting a light bundle and with optical elements for transforming this light bundle into the shape of a light sheet, particularly suitable for illuminating individual planes of a three-dimensional specimen in selective plane illumination microscopy (SPIM). According to the invention, means are provided for varying the cross section of the light sheet, for varying the length of the light sheet and/or for influencing the direction in which individual beam components extending within the light sheet are directed to the specimen substance. This makes it possible to adapt the geometry of the light sheet to the illumination requirements for observing one and the same specimen plane with a plurality of different objectives and, if required, to reduce shadows occurring within the observed specimen plane as a result of the illumination.

25 Claims, 7 Drawing Sheets

(56) References Cited

FOREIGN PATENT DOCUMENTS

| | | |
|---|---|---|
| DE | 10 2004 034 961 | 2/2006 |
| DE | 10 2004 034 990 | 2/2006 |
| DE | 10 2004 034 996 | 2/2006 |
| DE | 10 2005 027 077 | 5/2006 |
| EP | 0 248 204 | 12/1987 |

* cited by examiner

OPTICAL ARRANGEMENT FOR THE PRODUCTION OF A LIGHT-SHEET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*Notice: More than one reissue application has been filed for the reissue of U.S. Pat. No. 7,787,179. The reissue applications are U.S. patent application Ser. No. 13/600,663 (now abandoned), filed on Aug. 31, 2012, which is a reissue patent application of U.S. Pat. No. 7,787,179, filed as U.S. patent application Ser. No. 11/946,232 on Nov. 28, 2007; and U.S. patent application Ser. No. 13/932,475 (the present application), filed on Jul. 1, 2013, which is a divisional reissue patent application of U.S. patent application Ser. No. 13/600,663.*

This application claims priority of German Application No. 10 2007 015 08.8, filed Mar. 29, 2007, the complete disclosure of which is hereby incorporated by reference.

BACKGROUND OF THE INVENTION a) Field of the Invention

The invention is directed to an optical arrangement with a light source for emitting a light bundle and with optical elements for transforming this light bundle into the shape of a light sheet, particularly suitable for illuminating individual planes of a three-dimensional specimen in selective plane illumination microscopy (SPIM).

b) Description of the Related Art

In contrast to confocal laser scanning microscopy (LSM), in which a three-dimensional specimen is scanned point by point in individual planes of different depth and the image information thus acquired is then combined to form a three-dimensional image of the specimen, the SPIM technique relies on widefield microscopy and makes it possible to display an image of the specimen based on optical sections through individual planes of the specimen.

The advantages of the SPIM technique include the greater speed at which image information is acquired, the reduced risk of bleaching biological specimens, and an expanded penetration depth of the focus in the specimen.

In principle, in the SPIM technique fluorophores which are by themselves contained in the specimen or have been introduced into the specimen for contrasting are excited by laser light, and the laser radiation is formed into a light sheet, as it is called. A selected plane in the depth of the specimen is illuminated by the light sheet and an image of this specimen plane is acquired in the form of an optical section by imaging optics.

To illustrate the geometry of the light sheet more clearly, it will be assumed in the context of the present invention that the light sheet has a cross section which extends in the X and Y coordinate directions perpendicular to the beam direction of the laser light and a length which extends in the Z coordinate direction along the beam direction.

The optical axis of the objective by which the illuminated specimen plane is to be imaged or observed is oriented perpendicular to the Z coordinate direction.

Optical arrangements for generating a light sheet in connection with the SPIM technique are described in DE 102 57 423 A1 and DE 10 2005 027077 A1.

These arrangements produce only a rigid light sheet which is not variable with respect to its thickness, which should correspond to the extension in the X coordinate. This circumstance is particularly disadvantageous when one and the same plane of a specimen is to be imaged successively in time with different objectives whose optical imaging characteristics differ from one another.

In such cases, it is desirable to have the possibility of adapting the geometry of the light sheet, above all, its thickness, to the respective objective so that only the plane of interest is actually illuminated in the specimen and, accordingly, an unwanted bleaching of the specimen substance outside this plane is prevented. Also, the depth of focus of the light sheet can be adapted in this way to the respective object field being observed.

Another disadvantage in the arrangements mentioned above is that the light sheet that is generated with them has a Gaussian intensity profile in cross section so that a uniform illumination of the specimen plane being examined is impossible.

WO 2004/0530558 A1 describes a method in which a light-sheet type illumination is generated based on a relative movement between a line-shaped light field and the specimen to be observed. The light-sheet type illumination is carried out in that the light field is lined up multiple times successively in time due to the relative movement. This has the disadvantage that shadows result within the plane of the specimen being examined because of portions of the specimen substance which are not transparent for the illumination light and which lie in the illumination direction.

EP 0 248 204 B1 describes the generation of a line-shaped illumination with a linear fiber array and cylindrical lenses arranged downstream. However, again, the geometry of the light sheet cannot be varied.

The publication U.S. Pat. No. 4,826,299 describes the shaping of a light sheet with a Powell lens. The Powell lens has an aspherical profile in one coordinate direction and is flat in the coordinate orthogonal to it so that a virtually homogenized line-shaped light field is formed from a light bundle and can be used as a light sheet. However, again the geometry of this light sheet can not be varied, specifically with respect to its thickness and length, so that an optimal illumination through the specimen plane to be examined is also impossible in this case when using different objectives whose optical characteristics differ from one another.

All of the arrangements mentioned above have the disadvantage of unwanted shadows within the plane of the specimen being examined which are caused by portions of the specimen substance in the illumination direction which are not transparent for the illumination light.

OBJECT AND SUMMARY OF THE INVENTION

Proceeding from this prior art, it is the primary object of the invention to provide an optical arrangement for generating a light sheet which makes it possible to observe individual planes of a specimen with a greater efficiency than in previously known arrangements.

According to the invention, in an optical arrangement for generating a light sheet of the type mentioned above, means are provided for varying the cross section of the light sheet, for varying the length of the light sheet and/or for influencing the direction in which individual beam components extending within the light sheet are directed to the specimen substance.

This makes it possible to adapt the geometry of the light sheet to the illumination requirements for observing one and the same specimen plane with a plurality of different objectives and, if required, to achieve a reduction in shadows occurring within the observed specimen plane as a result of the illumination.

In a first construction of the arrangement according to the invention, a light source is provided which emits a bundle of coherent light in whose path are provided:

a collimator, an aspherical optical element, a lens or lens group for realizing a field diaphragm plane, and a lens or lens group for realizing an aperture diaphragm plane.

In this connection, a bundle of parallel light is initially generated by the collimator and is then transformed into the shape of the light sheet by means of the aspherical optical element. A Powell lens, for example, can be used as an aspherical optical element.

The cross section of the light sheet is adapted to the illumination requirements of a particular objective with a field diaphragm which is placed in the field diaphragm plane and whose diaphragm opening is adequate for the desired cross section. If the objective is exchanged for an objective with a different aperture or different imaging scale, for example, the field diaphragm is exchanged for a field diaphragm whose diaphragm opening corresponds to the desired cross section. By exchanging the diaphragms, a change in cross section with respect to the width of the light sheet is achieved, that is, its extension in the Y coordinate is varied.

The diaphragms can be arranged on a changer wheel, for example. Changing the diaphragms can be carried out manually or automatically, and the respective field diaphragm is chosen depending on the characteristics of the objective that is used.

A similar procedure is followed with the aperture diaphragms which are placed in the aperture diaphragm plane depending on the characteristics of the objective that is used. Exchanging the aperture diaphragms influences the geometry of the light sheet with respect to its thickness and its length. The reason that the thickness and length are influenced conjointly is that the depth of focus range depends upon the inverse square of the numerical aperture when the light sheet is generated anamorphotically by the aspherical optical element.

In an alternative construction, the influencing of the cross section is not carried out, as was described, by exchanging diaphragms, but by placing one or two zoom optics in the illumination beam path.

For this purpose, the lens group for realizing a field diaphragm and/or the lens group for realizing an aperture diaphragm are/is designed in such a way that they have a variable focal length.

Further, a device for reducing shadows in the specimen is provided in this first embodiment of the arrangement according to the invention.

To this end, a wobble plate is arranged in a pupil plane of the beam path which has already been shaped to form the light sheet, or an oscillating mirror or a polygon scanner is positioned in a plane conjugate to the field diaphragm plane.

Owing to the deflecting movement generated in this way, the direction of the beam components of the light sheet is influenced in such a way that these beam components strike the specimen substance successively in time in alternating directions so that shadows caused by opaque specimen substances within the illuminated specimen plane are prevented or at least substantially reduced.

In a second construction of the arrangement according to the invention, a light source is provided which emits a bundle of spatially partially coherent light, and one or two cylindrical-lens arrays and fixed or variable collimating optics are arranged in the path of this light bundle, the lateral coherence length being less than the period of the cylindrical-lens arrays.

The cylindrical-lens arrays take over the function of a honeycomb condenser in a plane, for example, the Y-Z plane, wherein the individual beam components or partial apertures generated by the first array are spatially superimposed in the field diaphragm plane with or without the help of a second array and the collimating optics. When a second array is present, the intensity distribution in the field diaphragm plane is more homogeneous than when a second array is not present. The geometry of the light sheet can be adapted by means of variable collimating optics.

The spatially partially coherent light is generated, for example, by means of a temporally partially coherent light source such as a broadband laser, a dispersive optical element being placed in its beam path for purposes of reducing the spatial coherence. A grating, a prism or a stepped mirror can be used as a dispersive optical element.

In a third construction of the arrangement according to the invention, the light source comprises an array of individual laser light sources. Located downstream of these light sources are a cylindrical lens or GRIN lens extending over the entire array and collimating optics. Every laser light source completely illuminates the entire desired light sheet. The width of the light sheet in the Y-Z plane is determined by the emitted aperture of the laser light sources and the focal length of the collimating optics. The thickness of the light sheet in the X-Z plane is determined by the emitted aperture of the light sources and the focal lengths of the cylindrical optics and collimating optics. Because of the spatial arrangement of the laser light sources, every light source illuminates the specimen plane at a different angle so that shadows within the specimen plane are prevented or at least substantially reduced as was described above.

With GRIN lenses, in contrast to conventional collector lenses, the focal length is influenced by a continuous variation of the refractive index in the lens material.

In a fourth construction of the arrangement according to the invention, a micro-optical element for transforming the light bundle into the shape of a light sheet is arranged in the light bundle coming from a coherent light source and exiting from a light-conducting fiber.

This micro-optical element can be micro-optics provided with optically active free-form surfaces or micro-optics which are constructed in the form of a GRIN lens and which have simultaneously a homogenizing effect in one cross-sectional direction and a focusing effect in the orthogonal cross-sectional direction.

A fifth construction of the arrangement according to the invention provides a light source which emits a bundle of coherent light within whose path the following components are provided:

anamorphotic optics, for example, in the form of a cylindrical lens telescope, for generating a light bundle with an elliptic cross section, an optical deflection device, for example, in the form of an oscillating mirror, a polygon scanner or a digital micromirror device (DMD) for generating a scanning movement of this light bundle, and a focusing lens or lens group through which the scanned light bundle is directed to the specimen.

In a manner known per se, the DMD comprises about 500,000 microscopically small mirrors which can be tilted very quickly individually.

A light-sheet-like illumination is generated by this arrangement in that the light bundle which has an elliptic cross section and is focused in the specimen is lined up multiple times successively with respect to time due to the scanning movement. The lining up of the individually focused light bundles yields the geometry of the light sheet.

Shadows due to non-transparent specimen substances within the illuminated specimen plane are prevented or reduced in this construction of the arrangement according to the invention by the cylindrical lens telescope through which the direction of individual beam components is influenced as was described above.

The invention will be described more fully in the following with reference to embodiment examples.

DESCRIPTION OF THE PREFERRED EMBODIMENTS

Figure 10:
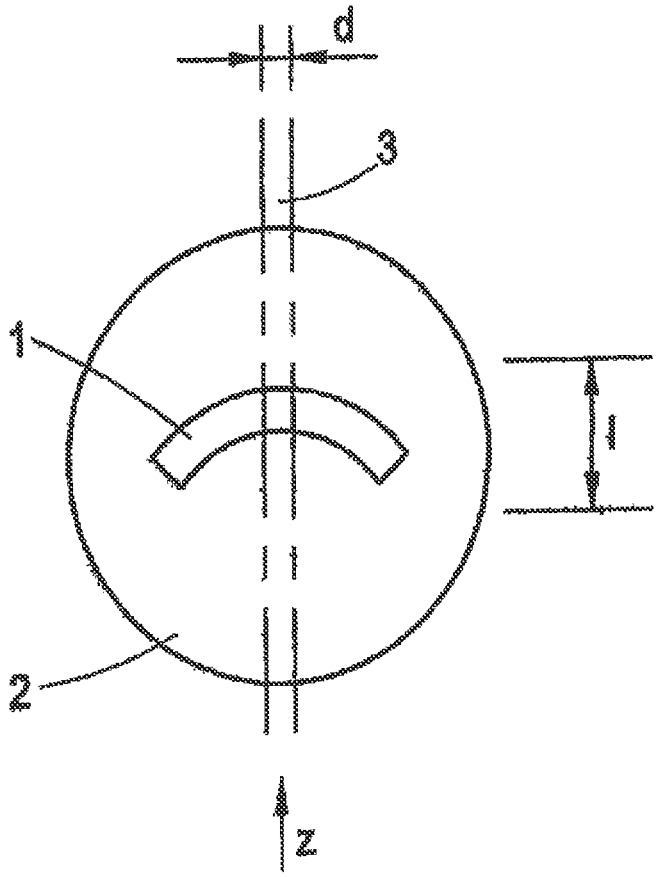
Fig. 10 Prior Art
FIG. 10 shows a first illustration of the prior art.

In FIG. 10, which will serve in the following for a brief explanation of the principle of selective plane illumination microscopy (SPIM) in the prior art, a specimen 1, for example, a biological substance, is surrounded by a transparent gel 2. This specimen 1 is a three-dimensional specimen 1 which extends in the drawing plane and perpendicular to the drawing plane. It will be assumed that the gel 2 is shaped to form a circular cylinder with an axis of rotation oriented perpendicular to the drawing plane.

As was already slated above, three-dimensional images of the specimen 1 are obtained on the basis of a plurality of optical sections through individual specimen planes by the SPIM technique. It will be assumed that the plane of the specimen 1 to be observed has the thickness d in the drawing plane.

In order to observe this plane, a light sheet 3 having a length 1 and a thickness d in the drawing plane which remains as uniform as possible along the entire length 1 and which extends perpendicular to the drawing plane at least over the entire dimensioning of the specimen 1 is required.

In the context of the present description of the invention, it will be assumed that the length 1 of the light sheet 3 extends in the Z coordinate direction, its thickness d extends in the X coordinate direction, and its width b extends perpendicular to the drawing plane in the Y coordinate direction. The Z coordinate direction also corresponds to the direction of the illumination beam path.

Figure 1:
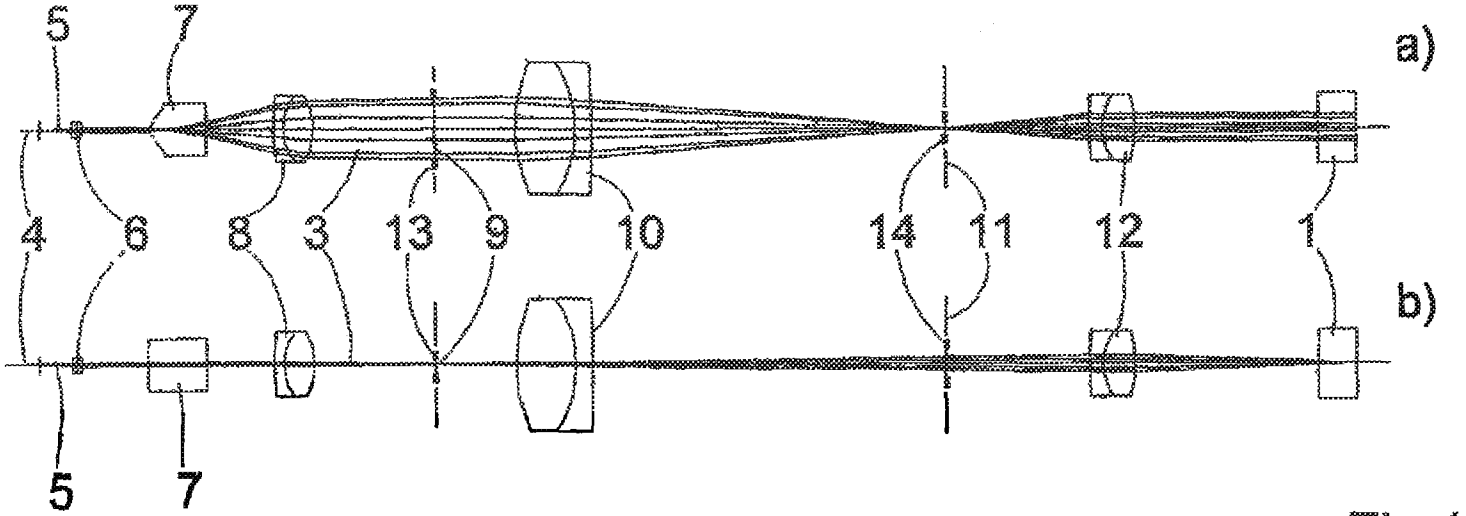
FIG. 1 shows the principle of a first construction of the arrangement according to the invention with diaphragms for influencing the geometry of the light sheet.

FIG. 1 shows a first construction of the arrangement according to the invention. A light source (not shown) emits a coherent light which exits from a light-conducting fiber 4 as a light bundle 5 and is directed through a collimator 6 to an aspherical element 7.

By passing through the aspherical element 7, the light bundle 5 is expanded in the Y-Z plane shown in FIG. 1a, while the light bundle 5 passes the aspherical element 7 in the X-Z plane, shown in FIG. 1b, substantially unchanged.

This reshaping yields the thickness d of the light sheet 3 in the X coordinate direction and its width b in the Y coordinate direction.

As is further shown in FIG. 1a and FIG. 1b, the illumination beam path which is shaped to form the light sheet 3 first passes a lens group 8, for example, an achromat, to realize a field diaphragm plane 9, then another lens group 10 to realize an aperture diaphragm plane 11 and, finally, a third lens group 12 constructed as focusing optics through which the light sheet 3 is directed into the specimen 1.

When a field diaphragm 13 is placed in the field diaphragm plane 9, the geometry of the light sheet 3 is defined with respect to its width b by the diaphragm opening of the field diaphragm 13. The diaphragm opening of an aperture diaphragm 14 placed in the aperture diaphragm plane 11 determines the thickness d and the length 1 of the light sheet 3.

In this way, with a field diaphragm 13 of a determined diaphragm opening and an aperture diaphragm 14 of a determined diaphragm opening, the cross section and the length 1 of the light sheet 3 can be adapted to an objective used to observe the selected plane of the specimen 1.

If this objective is exchanged for a different objective to observe the same plane of the specimen 1, for example, to observe the same plane with another imaging scale, the invention provides that:

the current field diaphragm 13 is exchanged for a field diaphragm 13 whose diaphragm opening is adapted to this second objective, or the current aperture diaphragm 14 is exchanged for an aperture diaphragm 14 whose diaphragm opening is adapted to this substituted objective, or both diaphragms 13, 14 are exchanged at the same time to adapt the cross section and the length 1 of the light sheet to the substituted objective and, therefore, to make possible an efficient observation of the specimen 1 in the selected plane.

The thickness d and length 1 of the light sheet 3 cannot be adjusted independently from one another because, as was already stated, the depth of focus range depends upon the inverse square of the numerical aperture of the focused light bundle when the light sheet 3 is generated anamorphotically by the aspherical optical element 7.

It is conceivable to change the diaphragms 13, 14 either manually or automatically. In the latter case, the diaphragms 13, 14 are arranged, for example, on changer wheels coupled with the drives and the drives are coupled with a control unit from which actuating commands are issued which are generated depending on the characteristics of the substituted objective.

Figure 2:
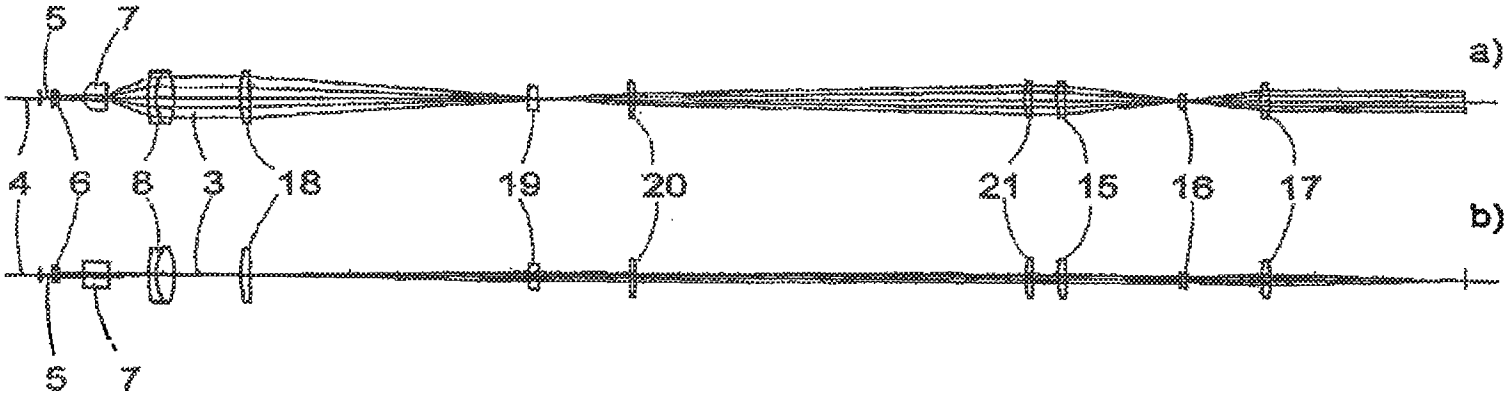
FIG. 2 shows the principle of the first construction of the arrangement according to the invention, but in this case with zoom optics for influencing the geometry of the light sheet.

FIG. 2 shows the first construction of the arrangement according to the invention in a variant in which zoom optics, which in this instance comprise lens groups 15, 16 and 17, for example, are provided for influencing the geometry of the light sheet 3 instead of the Held diaphragm and aperture diaphragm.

For the sake of clarity, the reference numbers used in FIG. 2 are the same as those used in FIG. 1 for identical optical components. As in FIG. 1, the Y-Z plane is shown in FIG. 2a and the X-Z plane is shown in FIG. 2b.

To reshape the light bundle 5 into a light sheet 3, an aspherical element 7 similar to that shown in FIG. 1 is again provided in the variant according to FIG. 2, a lens group 8, preferably, an achromat, being arranged downstream of the aspherical element 7 in order to realize a field diaphragm plane. A light sheet 3 with a homogenized radiation intensity in cross section is formed in the field diaphragm plane. The field diaphragm plane is located, for example, directly in front of a lens 18. The light sheet 3 is imaged in the object plane, and accordingly in the specimen 1, by means of a lens 19 and the lens groups 15, 16 and 17 of the zoom optics.

Influencing of the geometry of the light sheet 3 with the zoom optics is carried out in that the focal length of the zoom is varied, for example, by means of axial displacement of the lens groups 15 and 17. The lenses 18 to 21 ensure the correct pupil position within the zoom optics and guarantee a substantially collimated beam path in the field diaphragm plane in the Y-Z section. In this constructional variant, the lenses 20 and 21 are constructed as cylindrical lenses.

Figure 3:
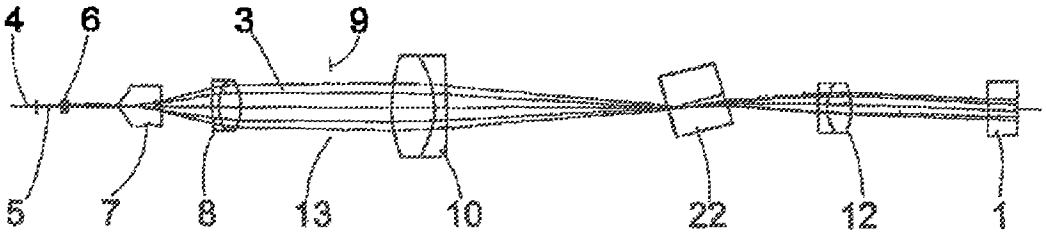
FIG. 3 shows the principle of the first construction of the arrangement according to the invention with a wobble plate for reducing shadows.

FIG. 3 shows a modified variant of the first construction of the arrangement according to the invention which was mentioned above with reference to FIG. 1 and FIG. 2. The identical reference numbers are again used to designate the same components.

Only the section in the Y-Z plane is shown; the X-Z plane is omitted since it follows analogously from FIG. 1 and FIG. 2.

In contrast to and in addition to the variants according to FIG. 1 and FIG. 2, a device for reducing the formation of shadows in the specimen 1 is provided in the variant according to FIG. 3. By reducing the formation of shadows, shadows are prevented on the specimen substance that lies behind specimen particles not transparent to the illumination light in the direction of the illumination beam within the observed specimen plane.

In this regard, it can be seen from FIG. 3 that after passing the field diaphragm 13 and the lens group 10 the light sheet 3 strikes a wobble plate 22 which is located in a pupil plane of the illumination beam path that is shaped to form the light sheet 3. Because of the oscillating movements of the wobble plate, the direction of the beam components of the light sheet 3 is influenced in such a way that they strike the specimen substance successively in time in alternating directions and at different angles so that non-transparent specimen substances are illuminated from behind and shadows caused by these specimen substances within the illuminated specimen plane are prevented or at least substantially reduced.

Figure 4:
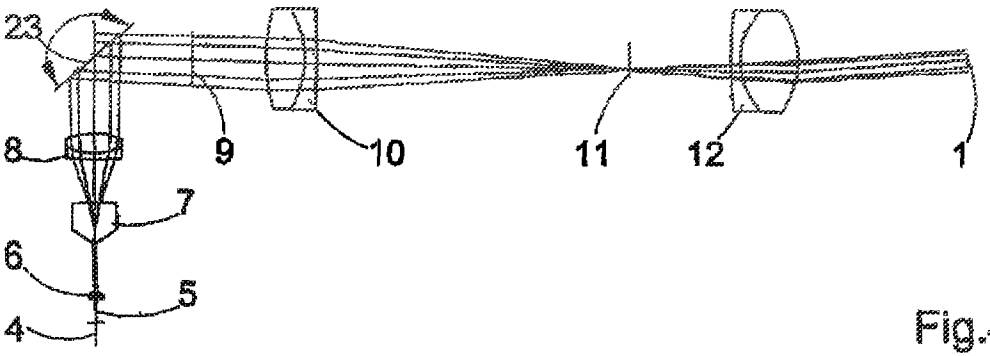
FIG. 4 shows the principle of the first construction of the arrangement according to the invention, but with an oscillating mirror for reducing shadows.

FIG. 4 shows another variant for reducing shadows relating to the first construction of the arrangement according to the invention which was described above with reference to FIGS. 1 to 3. In this case, an oscillating mirror 23 is positioned in a plane conjugate to the field diaphragm plane 9. Because of its oscillating motion, the oscillating mirror 23, similar to the wobble plate in FIG. 3, causes the direction of the beam components of the light sheet 3 to be influenced in such a way that they strike the specimen substance in different directions.

Figure 5:
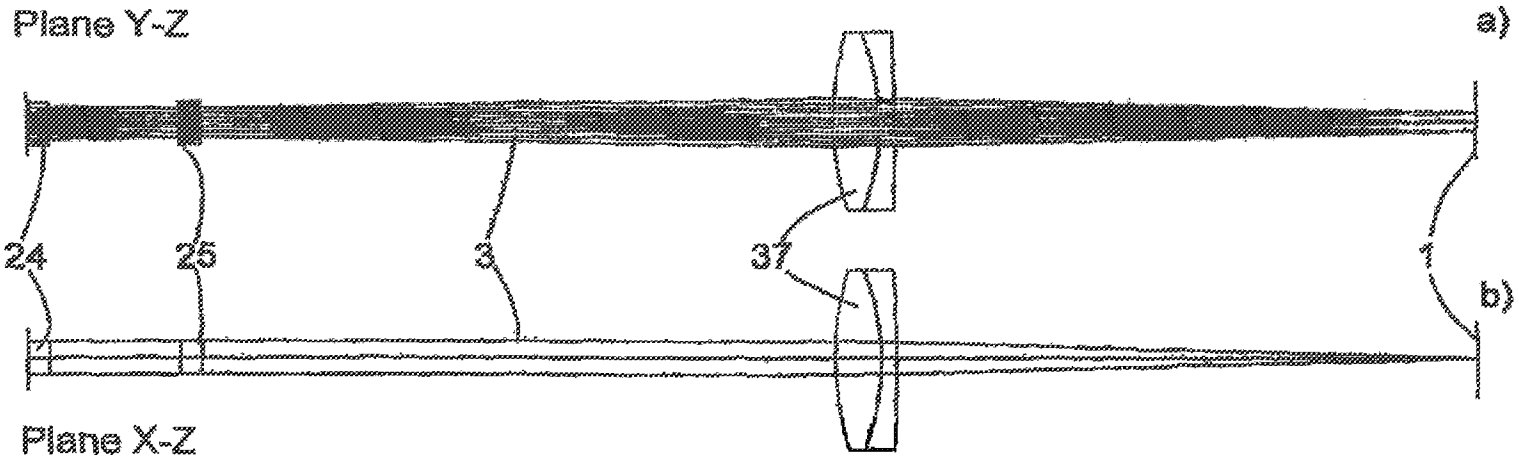
FIG. 5 shows the principle of a second construction of the arrangement according to the invention with cylindrical-lens arrays for shaping the light sheet and for reducing shadows.

In a second construction of the arrangement according to the invention shown in FIG. 5, a light source which radiates a bundle of spatially partially coherent light is required. Two cylindrical-lens arrays 24 and 25 are arranged in the path of the light coming from this light source (not shown in the drawing). Together with collimating optics 37, these two cylindrical-lens arrays 24 and 25 form a honeycomb condenser which acts in the Y-Z plane and through which an homogenization of the radiation intensity is achieved in this Y-Z plane. Only collimating optics 37 which generate the thickness d of the light sheet in the specimen plane acts in the X-Z plane. The Y-Z plane is again shown in FIG. 5a and the X-Z plane is shown in FIG. 5b.

Figure 6:
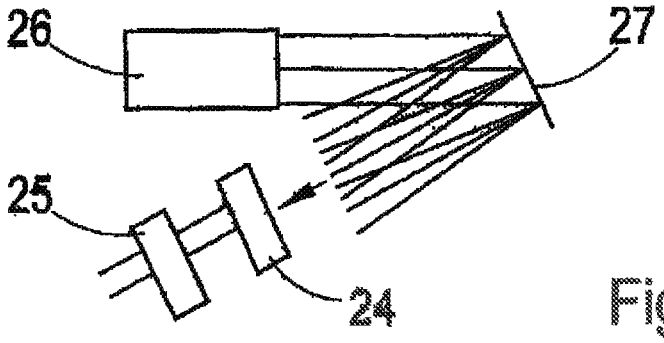
FIG. 6 shows an example for generating spatially partially coherent light for realizing the construction according to FIG. 5.

The spatially partially coherent light required for the arrangement according to the invention shown in FIG. 5 can be generated, for example, as in FIG. 6.

In this case, a broadband laser 26 is provided. A temporally partially coherent beam proceeds from this broadband laser 26 and is directed to a grating 27. The grating 27 acts as a dispersive optical element so that the spatial coherence of the light reflected by the grating 27 is reduced. This light strikes the cylindrical-leas arrays 24 and 25 as is shown in FIG. 5. Alternatively, dispersive optical elements in the form of prisms or stepped mirrors can also be used instead of the grating 27.

Figure 7:
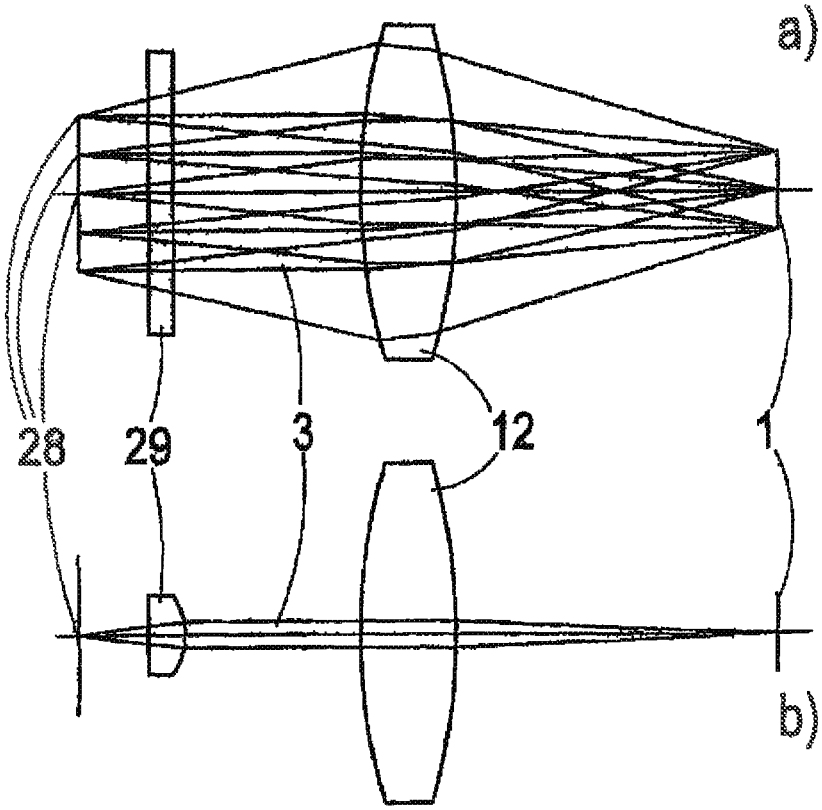
FIG. 7 shows the principle of a third construction of the arrangement according to the invention with an array of individual laser light sources for shaping the light sheet.

FIG. 7 shows a third construction of the arrangement according to the invention for generating a light sheet 3. In this case, the light source comprises an array of individual laser light sources 28. Each light source generates a complete light sheet 3 by means of the cylindrical lens 29 and the lens group 12. The spatial arrangement of the laser light sources 28 influences the direction of individual radiation components in such a way that shadows due to non-transparent specimen substances within the illuminated specimen plane are prevented or substantially reduced.

It is also possible to use a GRIN lens instead of the cylindrical lens 29.

Figure 8:
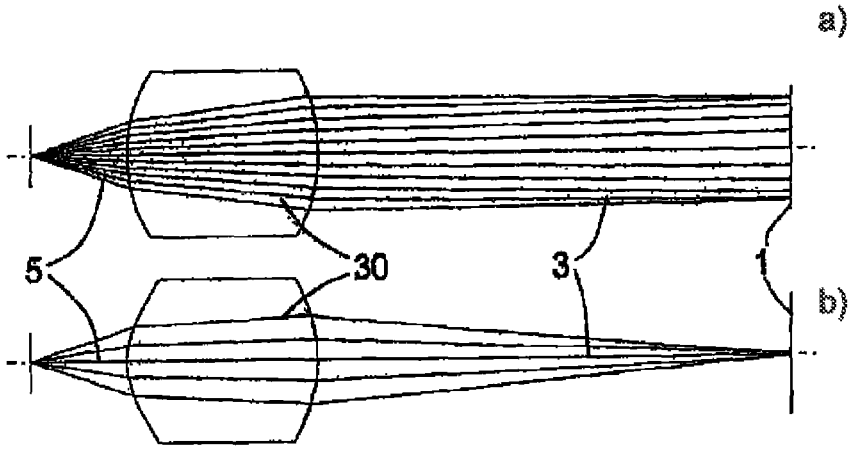
FIG. 8 shows the principle of a fourth construction of the arrangement according to the invention in which the light sheet is shaped by a micro-optical element.

FIG. 8 shows a fourth construction of the arrangement according to the invention. In this case, a light bundle 5 coming from a coherent light source and exiting from a light-conducting fiber (not shown) is directed to a micro-optical element 30 which provides for the transformation of the light bundle 5 into the shape of a light sheet 3. This micro-optical element 30 can be, for example, micro-optics provided with optically active free-form surfaces, or it can be constructed in the form of a GRIN lens.

Aside from transforming the light bundle 5 into the shape of the light sheet 3, a micro-optical element 30 of the kind mentioned above also achieves a homogenizing action in the Y-Z plane (shown in FIG. 8a) and a focusing action in the orthogonal plane X-Z (shown in FIG. 8b).

Figure 9:
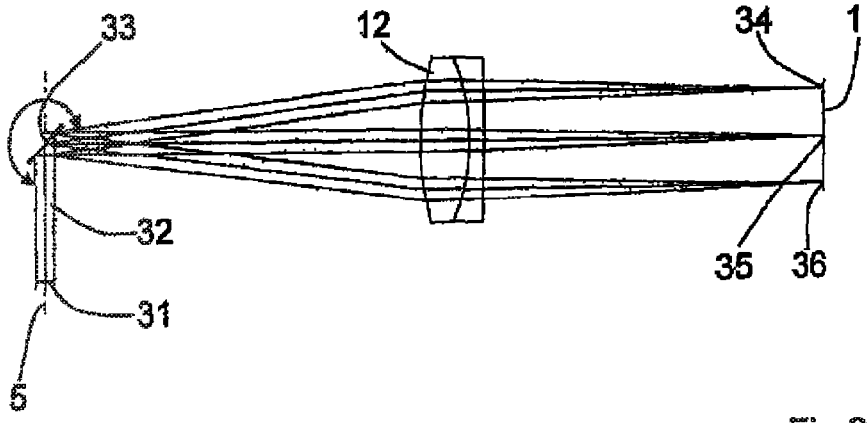
FIG. 9 shows the principle of a fifth construction of the arrangement according to the invention in which the light sheet is shaped by one-dimensional scanning of a light bundle.

Another, fifth construction of the arrangement according to the invention is shown in FIG. 9. Realization of this construction again requires a light source from which a light bundle 5 of coherent light proceeds. The light bundle 5 is directed to anamorphotic optics, for example, in the form of a cylindrical telescope 31 which causes an independent cross-sectional change in the light bundle 5 in the X-axis and Y-axis so that the light bundle obtains an elliptical cross section. An optical deflecting device, in this case, for example, in the form of an oscillating mirror 33, is arranged further along the path. It is also conceivable to use a polygon scanner or a DMD instead of the oscillating mirror 33 to generate a scanning movement.

The light bundle which is deflected in a scanning manner by the oscillating mirror 33 is directed into the specimen 1 through the lens group 12.

As a result of the scanning movement of the oscillating mirror 33, the elliptical light bundle that is focused in the specimen is located successively in time at positions 34, 35 and 36. The lining up of the respective illuminated areas in the specimen 1 yields the desired light sheet 3.

In this construction, shadows are prevented or reduced within the observed specimen plane due to the radiating angle occurring when focusing. The beam angles can be adjusted through the characteristics of the anamorphotic optics 31.

While the foregoing description and drawings represent the present invention, it will be obvious to those skilled in the art that various changes may be made therein without departing from the true spirit and scope of the present invention.

REFERENCE NUMBERS

1 specimen
2 gel
3 light sheet
4 light-conducting fiber
5 light bundle
6 collimator
7 aspherical optical element
8 lens group
9 field diaphragm plane
10 lens group
11 aperture diaphragm plane
12 lens group
13 field diaphragm
14 aperture diaphragm
15, 16, 17 lens groups
18, 19, 20, 21 lenses
22 wobble plate
23 oscillating mirror
24 cylindrical-lens array
25 cylindrical-lens ray
26 broadband laser
27 grating
28 laser light sources
29 cylindrical lens
30 micro-optical element
31 cylindrical-lens telescope
32 light bundle with elliptical cross section
33 oscillating mirror
34, 35, 36 positions
37 collimating optics

The invention claimed is:

[1. An optical arrangement for generating a light sheet, particularly for illuminating a three-dimensional specimen in selective plane illumination microscopy (SPIM), comprising:
- a light source for emitting a light bundle;
- optical elements for transforming said light bundle into the shape of a light sheet;
- means for varying the cross section;
- means for varying the length; and/or
- means for influencing the direction in which beam components extending within the light sheet are directed to the specimen substance;
- wherein the aspherical optical element is in the form of a Powell lens; and
- wherein the light source emits a light bundle of coherent light, in whose path are provided:
  - a collimator;
  - an aspherical optical element; and
  - a lens or lens group for realizing a field diaphragm plane; and
  - a lens or lens group for realizing an aperture diaphragm plane.]

[2. An optical arrangement for generating a light sheet, particularly for illuminating a three-dimensional specimen in selective plane illumination microscopy (SPIM), comprising:
- a light source for emitting a light bundle;
- optical elements for transforming said light bundle into the shape of a light sheet;
- means for varying the cross section;
- means for varying the length; and/or
- means for influencing the direction in which beam components extending within the light sheet are directed to the specimen substance;
- wherein a plurality of field diaphragms which can be exchanged with one another in the field diaphragm plane and which have different diaphragm openings are provided as means for varying the cross section of the light sheet; and
- wherein the light source emits a light bundle of coherent light, in whose path are provided:
  - a collimator;
  - an aspherical optical element; and
  - a lens or lens group for realizing a field diaphragm plane; and
  - a lens or lens group for realizing an aperture diaphragm plane.]

[3. An optical arrangement for generating a light sheet, particularly for illuminating a three-dimensional specimen in selective plane illumination microscopy (SPIM), comprising:
- a light source for emitting a light bundle;
- optical elements for transforming said light bundle into the shape of a light sheet;
- means for varying the cross section;
- means for varying the length; and/or
- means for influencing the direction in which beam components extending within the light sheet are directed to the specimen substance;
- wherein a plurality of aperture diaphragms which can be exchanged with one another in the aperture diaphragm plane and which have different diaphragm openings are provided as means for varying the length of the light sheet; and
- wherein the light source emits a light bundle of coherent light in whose path are provided:
  - a collimator;
  - an aspherical optical element; and
  - a lens or lens group for realizing a field diaphragm plane; and
  - a lens or lens group for realizing an aperture diaphragm plane.]

[4. An optical arrangement for generating a light sheet, particularly for illuminating a three-dimensional specimen in selective plane illumination microscopy (SPIM), comprising:
- a light source for emitting a light bundle;
- optical elements for transforming said light bundle into the shape of a light sheet;
- means for varying the cross section;
- means for varying the length; and/or means for influencing the direction in which beam components extending within the light sheet are directed to the specimen substance;

wherein a wobble plate is provided for influencing the direction of beam components; and wherein the light source emits a light bundle of coherent light, in whose path are provided:

a collimator;

an aspherical optical element; and a lens or lens group for realizing a field diaphragm plane; and a lens or lens group for realizing an aperture diaphragm plane.]

[5. An optical arrangement for generating a light sheet, particularly for illuminating a three-dimensional specimen in selective plane illumination microscopy (SPIM), comprising:

a light source for emitting a light bundle;

optical elements for transforming said light bundle into the shape of a light sheet;

means for varying the cross section;

means for varying the length; and/or means for influencing the direction in which beam components extending within the light sheet are directed to the specimen substance;

wherein an oscillating mirror or a polygon scanner is provided for influencing the direction of beam components; and wherein the light source emits a light bundle of coherent light, in whose path are provided:

a collimator;

an aspherical optical element; and a lens or lens group for realizing a field diaphragm plane; and a lens or lens group for realizing an aperture diaphragm plane.]

[6. An optical arrangement for generating a light sheet, particularly for illuminating a three-dimensional specimen in selective plane illumination microscopy (SPIM), comprising:

a light source for emitting a light bundle;

optical elements for transforming said light bundle into the shape of a light sheet;

means for varying the cross section;

means for varying the length; and/or means for influencing the direction in which beam components extending within the light sheet are directed to the specimen substance;

wherein the light source emits a light bundle of spatially partially coherent light, and a cylindrical honeycomb condenser, preferably comprising two one-dimensional cylindrical-lens arrays and collimating optics, is arranged in the path of this light bundle, wherein the lateral coherence length is less than the period of the cylindrical-lens arrays.]

[7. The optical arrangement according to claim 6;

wherein a temporally partially coherent light source, particularly in the form of a broadband laser, is provided for generating the spatially partially coherent light, a dispersive optical element.]

[8. The optical arrangement according to claim 7;

wherein the dispersive optical element is in the form of a grating and the coherent light source is in the form of a broadband laser.]

[9. An optical arrangement for generating light sheet, particularly for illuminating a three-dimensional specimen in selective plane illumination microscopy (SPIM), comprising:

a light source for emitting a light bundle;

optical elements for transforming said light bundle into the shape of a light sheet;

means for varying the cross section;

means for varying the length; and/or means for influencing the direction in which beam components extending within the light sheet are directed to the specimen substance;

wherein the light source comprises an array of individual laser light sources, and a cylindrical lens or a GRIN lens is arranged downstream of this array.]

[10. An optical arrangement for generating a light sheet, particularly for illuminating a three-dimensional specimen in selective plane illumination microscopy (SPIM), comprising:

a light source for emitting a light bundle;

optical elements for transforming said light bundle into the shape of a light sheet;

means for varying the cross section;

means for varying the length; and/or means for influencing the direction in which beam components extending within the light sheet are directed to the specimen substance;

wherein a micro-optical element is provided for transforming the light bundle into the shape of a light sheet and has a homogenizing effect in one cross-sectional axis and, at the same time, a focusing effect in the orthogonal cross-sectional axis.]

[11. The optical arrangement according to claim 10;

wherein the micro-optical element has optically active free-form surfaces or in the form of a GRIN lens.]

[12. An optical arrangement for generating a light sheet, particularly for illuminating a three-dimensional specimen in selective plane illumination microscopy (SPIM), comprising:

a light source for emitting a light bundle;

optical elements for transforming said light bundle into the shape of a light sheet;

means for varying the cross section;

means for varying the length; and/or means for influencing the direction in which beam components extending within the light sheet are directed to the specimen substance;

wherein the light source emits a light bundle of coherent light, within whose path are provided:

anamorphotic optics for generating a light bundle with an elliptic cross section;

an optical deflection device downstream of the latter for generating a scanning movement of this light bundle; and a focusing lens or lens group through which the scanned light bundle is directed to the specimen.]

[13. The optical arrangement according to claim 12;

wherein the anamorphotic optics is in the form of a cylindrical-lens telescope and the optical deflection device is preferably in the form of an oscillating mirror.]

*14. An optical arrangement for generating a light sheet for illuminating a three-dimensional specimen in selective plane illumination microscopy (SPIM), comprising:*

*means for forming a light sheet from light; and*

*light sheet influencing means for influencing the direction in which beam components extending within the light sheet are directed to the specimen substance such that the beam components strike the specimen substance successively in time in alternating directions such that shadows caused by non-transparent specimen substances within the illuminated plane are at least substantially reduced or prevented.*

*15. The optical arrangement according to claim 14 wherein the light sheet influencing means comprises:*

*an optical deflection device,*

*wherein the optical deflection device is positioned such that when the light sheet strikes the optical deflection device, oscillating movements of the optical deflection device influence the direction of beam components to strike the specimen substance successively in time in alternating directions.*

*16. The optical arrangement according to claim 15 wherein the optical deflection device comprises:*

*a wobble plate.*

*17. The optical arrangement according to claim 16, comprising:*

*the wobble plate being located in a pupil plane of the illumination beam path of the light sheet and positioned such that when the light sheet strikes the wobble plate, the oscillating movements of the wobble plate influence the direction of beam components to strike the specimen substance successively in time in alternating directions and at alternating angles.*

*18. The optical arrangement according to claim 15 wherein the optical deflection device comprises:*

*an oscillating mirror or polygon scanner.*

*19. The optical arrangement according to claim 18 comprising:*

*the oscillating mirror or polygon scanner being positioned in a plane conjugate to a field diaphragm plane.*

*20. The optical arrangement according to claim 14 comprising:*

*a light source for emitting a light bundle; and*

*wherein the means for forming a light sheet from light comprise optical elements for transforming the light bundle into the shape of the light sheet.*

*21. A method for generating a light sheet for illuminating a three-dimensional specimen in selective plane illumination microscopy (SPIM), comprising:*

*forming a light sheet from light; and*

*deflecting the light sheet to influence the direction in which beam components extending within the light sheet are directed to the specimen substance such that the beam components strike the specimen substance successively in time in alternating directions such that shadows caused by non-transparent specimen substances within the illuminated plane are at least substantially reduced or prevented.*

*22. The method according to claim 21 wherein method comprises:*

*deflecting the light sheet using an optical deflection device positioned in an optical arrangement such that when the light sheet strikes the optical deflection device, oscillating movements of the optical deflection device influence the direction of beam components to strike the specimen substance successively in time in alternating directions.*

*23. The method according to claim 22 wherein the method comprises:*

*deflecting the light sheet using a wobble plate positioned in a pupil plane of the illumination beam path of the light sheet,*

*wherein the wobble plate is positioned such that that when the light sheet strikes the wobble plate, the oscillating movements of the wobble plate influence the direction of beam components to strike the specimen substance successively in time in alternating directions and at alternating angles.*

*24. The method according to claim 22 wherein the method comprises:*

*deflecting the light sheet using an oscillating mirror or polygon scanner, the oscillating mirror or polygon scanner being positioned in a plane conjugate to a field diaphragm plane.*

*25. The method according to claim 21 wherein the method comprises:*

*emitting a light bundle from a light source; and*

*wherein the forming the light sheet from light comprises transforming the light bundle into the shape of the light sheet with optical elements.*

*26. An optical arrangement for generating a light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section;*

*means for varying the length; and/or*

*means for influencing the direction in which beam components extending within the light sheet are directed to the specimen substance;*

*wherein the aspherical optical element is in the form of a Powell lens; and*

*wherein the light source emits a light bundle of coherent light, in whose path are provided:*

*a collimator;*

*an aspherical optical element; and*

*a lens or lens group for realizing a field diaphragm plane; and*

*a lens or lens group for realizing an aperture diaphragm plane.*

*27. An optical arrangement for generating a light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section;*

*means for varying the length; and/or*

*means for influencing the direction in which beam components extending within the light sheet are directed to the specimen substance;*

*wherein a plurality of field diaphragms which can be exchanged with one another in the field diaphragm plane and which have different diaphragm openings are provided as means for varying the cross section of the light sheet; and*

*wherein the light source emits a light bundle of coherent light, in whose path are provided:*

*a collimator;*

*an aspherical optical element; and*

*a lens or lens group for realizing a field diaphragm plane; and*

*a lens or lens group for realizing an aperture diaphragm plane.*

*28. An optical arrangement for generating a light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section;*

*means for varying the length; and/or*

*means for influencing the direction in which beam components extending within the light sheet are directed to the specimen substance;*

*wherein a plurality of aperture diaphragms which can be exchanged with one another in the aperture diaphragm plane and which have different diaphragm openings are provided as means for varying the length of the light sheet; and*

*wherein the light source emits a light bundle of coherent light in whose path are provided:*

*a collimator;*

*an aspherical optical element; and*

*a lens or lens group for realizing a field diaphragm plane; and*

*a lens or lens group for realizing an aperture diaphragm plane.*

*29. An optical arrangement for generating a light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section;*

*means for varying the length; and/or*

*means for influencing the direction in which beam components extending within the light sheet are directed to the specimen substance;*

*wherein a wobble plate is provided for influencing the direction of beam components; and*

*wherein the light source emits a light bundle of coherent light, in whose path are provided:*

*a collimator;*

*an aspherical optical element; and*

*a lens or lens group for realizing a field diaphragm plane; and*

*a lens or lens group for realizing an aperture diaphragm plane.*

*30. An optical arrangement for generating a light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section; means for varying the length; and/or*

*means for influencing the direction in which beam components extending within the light sheet are directed to the specimen substance;*

*wherein an oscillating mirror or a polygon scanner is provided for influencing the direction of beam components; and*

*wherein the light source emits a light bundle of coherent light, in whose path are provided:*

*a collimator;*

*an aspherical optical element; and*

*a lens or lens group for realizing a field diaphragm plane; and*

*a lens or lens group for realizing an aperture diaphragm plane.*

*31. An optical arrangement for generating a light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section; means for varying the length; and/or*

*means for influencing the direction in which beam components extending within the light sheet are directed to the specimen substance;*

*wherein the light source emits a light bundle of spatially partially coherent light, and a cylindrical honeycomb condenser, preferably comprising two one-dimensional cylindrical-lens arrays and collimating optics, is arranged in the path of this light bundle, wherein the lateral coherence length is less than the period of the cylindrical-lens arrays.*

*32. The optical arrangement according to claim 31;*

*wherein a temporally partially coherent light source, particularly in the form of a broadband laser, is provided for generating the spatially partially coherent light, a dispersive optical element.*

*33. The optical arrangement according to claim 32;*

*wherein the dispersive optical element is in the form of a grating and the coherent light source is in the form of a broadband laser.*

*34. An optical arrangement for generating light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section;*

*means for varying the length; and/or*

*means for influencing the direction in which beam components extending within the light sheet are directed to the specimen substance;*

*wherein the light source comprises an array of individual laser light sources, and a cylindrical lens or a GRIN lens is arranged downstream of this array.*

*35. An optical arrangement for generating a light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section; means for varying the length; and/or*

*means for influencing the direction in which beam components extending within the light sheet are directed to the specimen substance;*

*wherein a micro-optical element is provided for transforming the light bundle into the shape of a light sheet and has a homogenizing effect in one cross-sectional axis and, at the same time, a focusing effect in the orthogonal cross-sectional axis.*

*36. The optical arrangement according to claim 35;*

*wherein the micro-optical element has optically active free-form surfaces or in the form of a GRIN lens.*

*37. An optical arrangement for generating a light sheet, particularly for illuminating a three-dimensional specimen in selective plane illumination microscopy (SPIM), comprising:*

*a light source for emitting a light bundle;*

*optical elements for transforming said light bundle into the shape of a light sheet;*

*means for varying the cross section;*

*means for varying the length; and/or*

*means for influencing the direction in which beam components extending within the light sheet are directed to the specimen substance;*

*wherein the light source emits a light bundle of coherent light, within whose path are provided:*

*anamorphotic optics for generating a light bundle with an elliptic cross section;*

*an optical deflection device downstream of the latter for generating a scanning movement of this light bundle; and*

*a focusing lens or lens group through which the scanned light bundle is directed to the specimen.*

*38. The optical arrangement according to claim 37; wherein the anamorphotic optics is in the form of a cylindrical-lens telescope and the optical deflection device is preferably in the form of an oscillating mirror.*

* * * * *